July 24, 1928.
H. J. YOUNT
MICROMETER CALIPER
Filed Aug. 9, 1927
1,678,030
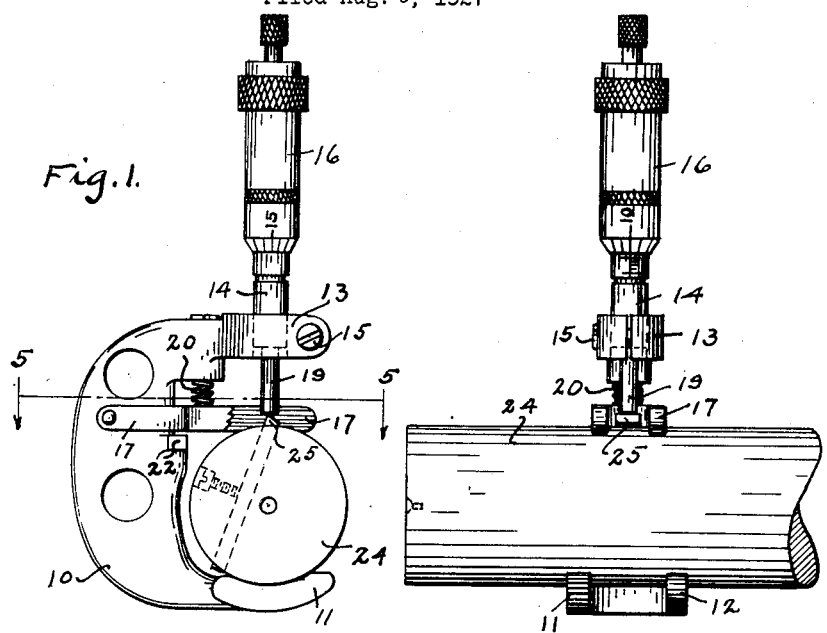
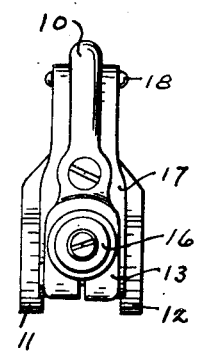
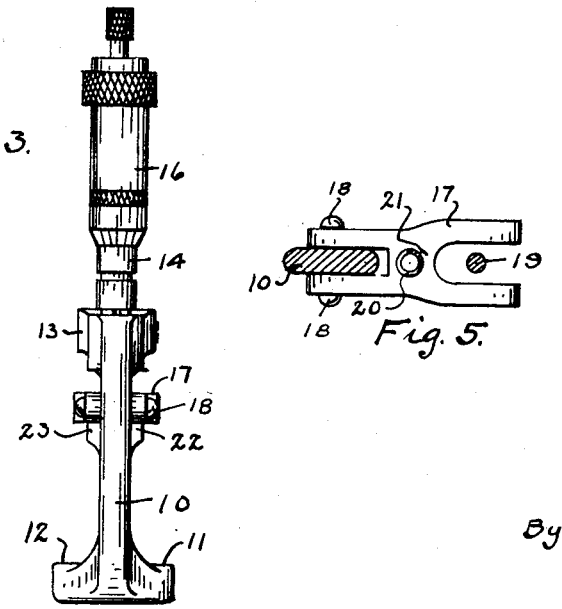
INVENTOR,
Horace J. Yount,
By Minturn & Minturn,
Attorneys.

Patented July 24, 1928.

1,678,030

UNITED STATES PATENT OFFICE.

HORACE J. YOUNT, OF INDIANAPOLIS, INDIANA.

MICROMETER CALIPER.

Application filed August 9, 1927. Serial No. 211,817.

This invention relates generally to a micrometer caliper of the type adapted for use in determining outside diameters, and in particular to a caliper particularly adapted for use in determining the accurate setting of the cutter in a boring bar whereby the exact diameter of the hole to be bored may be determined within a few thousandths of an inch of the setting of the tool.

The invention is described in one particular form with reference being made to the accompanying drawing, in which—

Fig. 1, is a side elevation of the micrometer caliper as applied to a boring bar;

Fig. 2, a front elevation of the caliper on the boring bar;

Fig. 3, a rear elevation of the caliper removed from the bar;

Fig. 4, a top plan view of the caliper; and

Fig. 5, a transverse section through the caliper on the line 5—5 in Fig. 1.

Like characters of reference indicate like parts throughout the several views.

The body 10 of the caliper is C-shaped and the lower end is bifurcated to have the pair of anvils 11 and 12 extending forwardly therefrom. Both anvils 11 and 12 present concave surfaces from above.

The upper end of the body carries the forwardly projecting bifurcated clamp member 13 which is bored vertically therethrough to receive the micrometer head shank 14, of the micrometer head 16, therein where it is adjustably secured in a vertical relation by the clamp screw 15 gripping the clamp members together on the shank 14.

An H-shaped jaw 17 straddles the body 10 to be pivotally secured thereto by the pin 18 and has the forward ends of the jaw 17 projected to straddle the head shaft 19. A spring 20 bearing against the body 10 by its upper end compressively engages against the cross bar 21 of the jaw 17 to press the jaw downwardly.

Lugs 22 and 23 project from the sides of the body 10 to serve as stops limiting the downward swing of the jaw 17. The under faces of the forward ends of the jaw are concave.

The caliper is shown in Figs. 1 and 2, as applied to a boring bar 24 which carries the cutting tool 25 passed through and adjustably secured to the bar in the manner well known to those versed in the art. The caliper is positioned in the bar 24 by passing the anvils 11 and 12 to one side of the bar and the jaw 17 to the other side, and by reason of the spring pressed jaw 17 and the concave faces in the jaw 17 and anvils 11 and 12, the caliper is retained on the bar 24 but may be swung circumferentially around the bar, or slid longitudinally of the bar. That is, the caliper may be snapped on or off the bar 24, or turned or moved to any position on the bar by merely swinging or pushing it, which permits positioning the caliper to insure freedom from any dirt or filings being between the anvil faces and the bar.

The caliper may, therefore, be swung over the tool 25 to determine its position or cutting diameter, whereupon the caliper may be swung back out of the way to permit adjusting the tool, and then returned for further calipering. The head 16 is fixed by its shank 14 in the clamp 13 in relation to the anvils 11 and 12 by previous location in relation to a standard bar, or the like, so that the actual diameter the tool 25 is set on may be read directly on the head 16.

As the invention is herein described in one particular form, I do not desire to be limited to that precise form, nor any more than may be necessitated by the following claims, since it is obvious that structural changes may be made without departing from the spirit of the invention.

I claim:

1. In a micrometer caliper, a caliper body, a micrometer head adjustably secured to the body, a bifurcated member extended from the body to form a pair of spaced anvils, an H-shaped jaw straddling said body by its rear legs and pivoted thereby to said body, a spring bearing between said body and said jaw normally causing said jaw to swing toward said anvils, a shaft extending from said micrometer head, and said jaw having its forwardly projecting legs positioned to permit said shaft to pass therebetween.

2. In a micrometer caliper, a caliper body, a micrometer head adjustably secured to the body, a bifurcated member extended from the body to form a pair of spaced anvils, an H-shaped jaw straddling said body by its rear legs and pivoted thereby to said body, a spring bearing between said body and said jaw normally causing said jaw to swing toward said anvils, a shaft extending from said micrometer head, and said jaw having its forwardly projecting legs positioned to permit said shaft to pass therebetween and stops limiting the travel of said jaw toward said anvils, said jaw and said anvils having concave adjacent faces.

3. A new article of manufacture having a C-shaped body with a pair of lower members projected forwardly from the body, a clamp member projected forwardly from the upper end of the body over said lower members, a jaw hinged to the body to swing toward said lower members, and a spring normally pressing the jaw downwardly.

4. A new article of manufacture having a C-shaped body with a pair of lower members projected forwardly from the body formed with concave surfaces from above, a clamp member projected forwardly from the upper end of the body over said lower members, a jaw hinged to the body to swing toward said lower members, and a spring normally pressing the jaw downwardly and stops limiting the downward travel of the jaw.

In testimony whereof I affix my signature.

HORACE J. YOUNT.